(12) United States Patent
Li

(10) Patent No.: US 8,988,633 B2
(45) Date of Patent: Mar. 24, 2015

(54) LIQUID CRYSTAL MODULE WITH EDGE-LIT BACKLIGHT AND LIQUID CRYSTAL DISPLAY DEVICE

(71) Applicant: Shenzhen China Star Optoelectronics Technology Co., Ltd., Shenzhen, Guangdong (CN)

(72) Inventor: Quan Li, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 324 days.

(21) Appl. No.: 13/810,229

(22) PCT Filed: Jan. 10, 2013

(86) PCT No.: PCT/CN2013/070331
§ 371 (c)(1),
(2) Date: Jan. 15, 2013

(87) PCT Pub. No.: WO2014/106353
PCT Pub. Date: Jul. 10, 2014

(65) Prior Publication Data
US 2014/0192288 A1  Jul. 10, 2014

(51) Int. Cl.
G02F 1/1333 (2006.01)
G02F 1/1335 (2006.01)
F21V 8/00 (2006.01)

(52) U.S. Cl.
CPC .................................. *G02B 6/0091* (2013.01)
USPC ................................................ 349/58; 349/65

(58) Field of Classification Search
None
See application file for complete search history.

(56) References Cited

U.S. PATENT DOCUMENTS

2009/0135331 A1*  5/2009  Kawase ........................ 349/58
2010/0165233 A1*  7/2010  Jung .............................. 349/58

* cited by examiner

*Primary Examiner* — Wen-Ying P Chen
(74) *Attorney, Agent, or Firm* — Andrew C. Cheng

(57) ABSTRACT

The present invention provides a liquid crystal module with edge-lit backlight, which includes aluminum extrusion, edge-lit backlight source, light guiding plate (LGP), optical film set, mold frame, and at least a magnetic device, disposed with at least an attaching surface, for attaching to backlight source substrate, and an outer surface protruding beyond the light-emitting surface of LEDs; the outer surface of magnetic device near or pressing against LGP and having a difference in height levels from light-emitting surface of LEDs. The present invention also discloses a liquid crystal display device adopting the above liquid crystal module with edge-lit backlight. As such, the present invention can prevent the coupling optical distance from being too small, improve the endurance of the impact on the backlight and improve the backlight life span.

18 Claims, 5 Drawing Sheets

LIQUID CRYSTAL MODULE WITH EDGE-LIT BACKLIGHT AND LIQUID CRYSTAL DISPLAY DEVICE

The present application claims priority of "LIQUID CRYSTAL MODULE WITH EDGE-LIT BACKLIGHT AND LIQUID CRYSTAL DISPLAY DEVICE", application number 201310003317.6 submitted to State Intellectual Property Office, People Republic of China dated Jan. 6, 2013.

BACKGROUND OF THE INVENTION

1. Field of the Invention

The present invention relates to the field of thin film transistor liquid crystal display (TFT-LCD) techniques, and in particular to a liquid crystal module with edge-lit backlight and liquid crystal display device.

2. The Related Arts

In known techniques, the backlight used by TFT-LCD is often light-emitting diode (LED) because of the advantage of energy efficiency.

In large-size liquid crystal display device with edge-lit backlight, the distance from the light-emitting surface of the LED backlight source of the backlight module to the light-guiding plate (LGP) is often called coupling optical distance. The coupling optical distance is a very important optical parameter which must be maintained within the 0.3-1.5 mm depending on the size of the liquid crystal display device. If the coupling optical distance is too large, the optical energy of the backlight source will be under-utilized. If the coupling optical distance is too small, the LGP will oppress the LED backlight source when LGP is impacted by an external force or expands due to heat, which may cause damage to the LED backlight source and lead to poor display quality or even black out. Thus, it is imperative to ensure precise coupling optical distance in the liquid crystal module in designing or manufacturing the liquid crystal display device.

SUMMARY OF THE INVENTION

The technical issue to be addressed by the present invention is to provide a liquid crystal module with edge-lit backlight and liquid crystal display device, for prevent coupling optical distance from being too small and ensure the safety of the backlight source.

The present invention provides a liquid crystal module with edge-lit backlight, which at least comprises: an aluminum extrusion with aluminum extrusion vertical plate; an edge-lit backlight source, disposed on inner side wall of the aluminum extrusion vertical plate, the backlight source comprising: a backlight source substrate and a plurality of LEDs disposed on the backlight source substrate with spacing; a light guiding plate (LGP), disposed with an incident light surface and a light-emitting surface, the incident light surface facing the light-emitting surface of the LEDs of the edge-lit backlight source; an optical film set, located above the LGP, facing the light-emitting surface of the LGP; a mold frame, located on outer side of the aluminum extrusion; at least a magnetic device, disposed with at least an attaching surface, for attaching to a nickel-plated layer disposed on the backlight source substrate between at least two LEDs or an iron layer wrapped in the backlight source substrate between at least two LEDs, and an outer surface protruding beyond the light-emitting surface of LEDs; the outer surface of the magnetic device facing the side of the LGP and having a difference in height levels from the light-emitting surface of the LEDs.

According to a preferred embodiment of the present invention, the magnetic device is an NdFeB magnet block.

According to a preferred embodiment of the present invention, the difference in height levels for the outer surface of the magnetic device protruding beyond the light-emitting surface of the LEDs is 0.3-1.5 mm.

According to a preferred embodiment of the present invention, the outer surface of the magnetic device is close to or presses against the LGP.

According to a preferred embodiment of the present invention, the aluminum extrusion comprises an aluminum extrusion bottom plate and an aluminum extrusion vertical plate extended from and perpendicular to the aluminum extrusion bottom plate.

According to a preferred embodiment of the present invention, the backlight source substrate is an aluminum plate or a glass fabric substrate.

The present invention provides a liquid crystal module with edge-lit backlight, which at least comprises: an aluminum extrusion with aluminum extrusion vertical plate; an edge-lit backlight source, disposed on inner side wall of the aluminum extrusion vertical plate, the backlight source comprising: a backlight source substrate and a plurality of LEDs disposed on the backlight source substrate with spacing; a light guiding plate (LGP), disposed with an incident light surface and a light-emitting surface, the incident light surface facing the light-emitting surface of the LEDs of the edge-lit backlight source; an optical film set, located above the LGP, facing the light-emitting surface of the LGP; a mold frame, located on outer side of the aluminum extrusion; at least a magnetic device, disposed with at least an attaching surface, for attaching to the backlight source substrate, and an outer surface protruding beyond the light-emitting surface of LEDs; the outer surface of the magnetic device facing the side of the LGP and having a difference in height levels from the light-emitting surface of the LEDs.

According to a preferred embodiment of the present invention, the difference in height levels for the outer surface of the magnetic device protruding beyond the light-emitting surface of the LEDs is 0.3-1.5 mm.

According to a preferred embodiment of the present invention, the magnetic device is an NdFeB magnet block.

According to a preferred embodiment of the present invention, the aluminum extrusion comprises an aluminum extrusion bottom plate and an aluminum extrusion vertical plate extended from and perpendicular to the aluminum extrusion bottom plate.

According to a preferred embodiment of the present invention, the backlight source substrate is an aluminum plate or a glass fabric substrate.

According to a preferred embodiment of the present invention, a plurality of LEDs is disposed on the backlight source substrate with spacing, a nickel-plated layer is disposed on the backlight source substrate between at least two LEDs, and the attaching surface of the magnetic device is attached to the nickel-plated layer.

According to a preferred embodiment of the present invention, a plurality of LEDs is disposed on the backlight source substrate with spacing, an iron layer is wrapped inside the backlight source substrate between at least two LEDs, and the attaching surface of the magnetic device is attached to the iron layer.

The present invention provides a liquid crystal display device, which comprises: a liquid crystal module with edge-lit backlight, wherein the liquid crystal module further comprising at least: an aluminum extrusion with aluminum extrusion vertical plate; an edge-lit backlight source, disposed on inner side wall of the aluminum extrusion vertical plate, the backlight source comprising: a backlight source substrate and a plurality of LEDs disposed on the backlight source substrate with spacing; a light guiding plate (LGP), disposed with an incident light surface and a light-emitting surface, the incident light surface facing the light-emitting surface of the LEDs of the edge-lit backlight source; an optical film set, located above the LGP, facing the light-emitting surface of the LGP; a mold frame, located on outer side of the aluminum extrusion; at least a magnetic device, disposed with at least an attaching surface, for attaching to a nickel-plated layer disposed on the backlight source substrate between at least two LEDs or an iron layer wrapped in the backlight source substrate between at least two LEDs, and an outer surface protruding beyond the light-emitting surface of LEDs; the outer surface of the magnetic device facing the side of the LGP and having a difference in height levels from the light-emitting surface of the LEDs.

According to a preferred embodiment of the present invention, the magnetic device is an NdFeB magnet block.

According to a preferred embodiment of the present invention, the difference in height levels for the outer surface of the magnetic device protruding beyond the light-emitting surface of the LEDs is 0.3-1.5 mm.

According to a preferred embodiment of the present invention, the outer surface of the magnetic device is close to or presses against the LGP.

According to a preferred embodiment of the present invention, the aluminum extrusion comprises an aluminum extrusion bottom plate and an aluminum extrusion vertical plate extended from and perpendicular to the aluminum extrusion bottom plate.

According to a preferred embodiment of the present invention, the backlight source substrate is an aluminum plate or a glass fabric substrate.

The efficacy of the present invention is that to be distinguished from the state of the art. According to the embodiments of the present invention, magnetic device (magnet block) is disposed between the adjacent LEDs on the LED light bar (backlight source substrate), and the magnetic device protrudes above the light-emitting surface of the LEDs for a certain distance so that when LGP contacts the magnetic device, the LGP will maintain a certain distance from the LEDs so as to ensure the coupling optical distance will not be too small. When the LGP is impacted by the external force or expands due to heat, the LGP will oppress the magnetic device and the magnetic device has sufficient strength to withstand the impact. As such, the LED will be free of impact or oppression to ensure the safety of the LEDs.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

Figure 1:
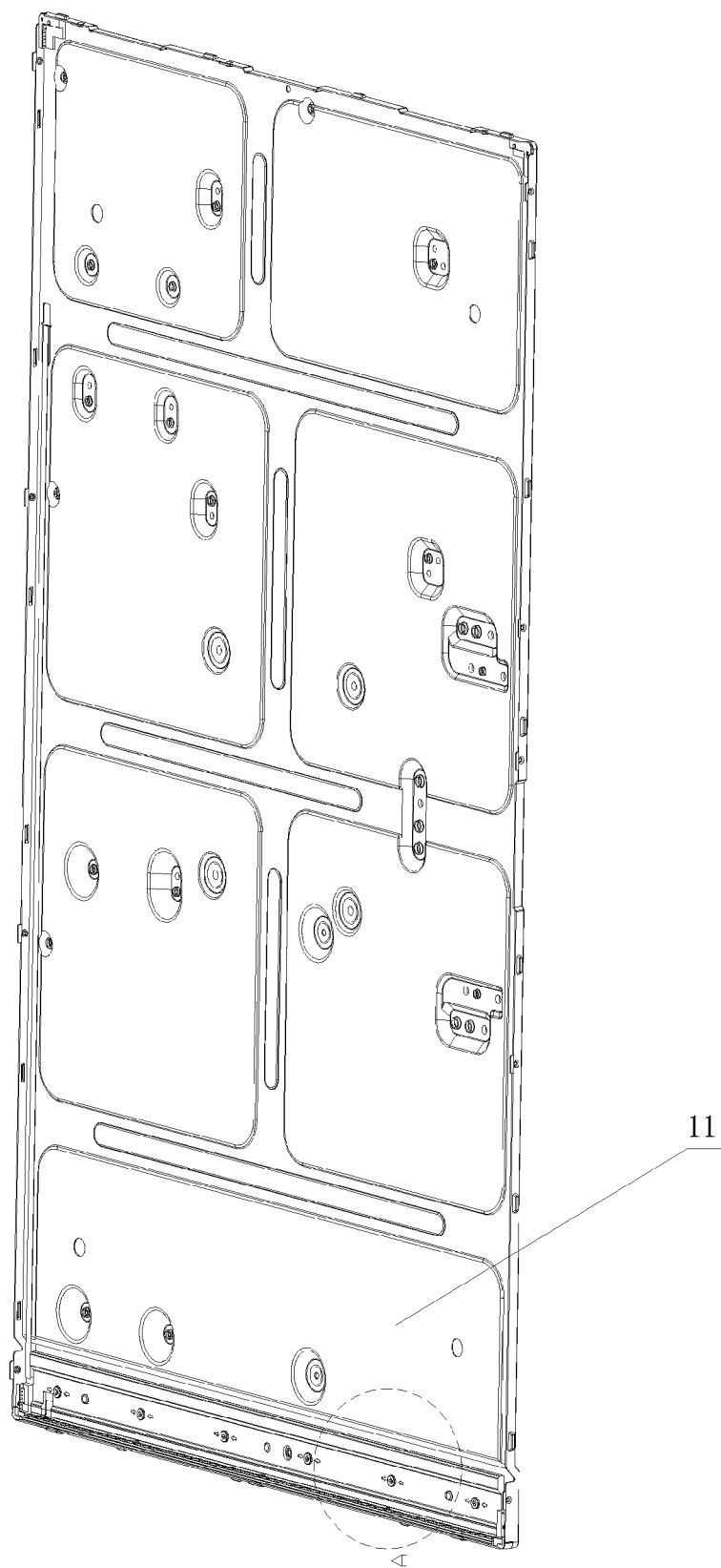
FIG. 1 is a schematic view showing the structure of a liquid crystal module with edge-lit backlight according to an embodiment of the present invention before installing the LGP.
Figure 2:
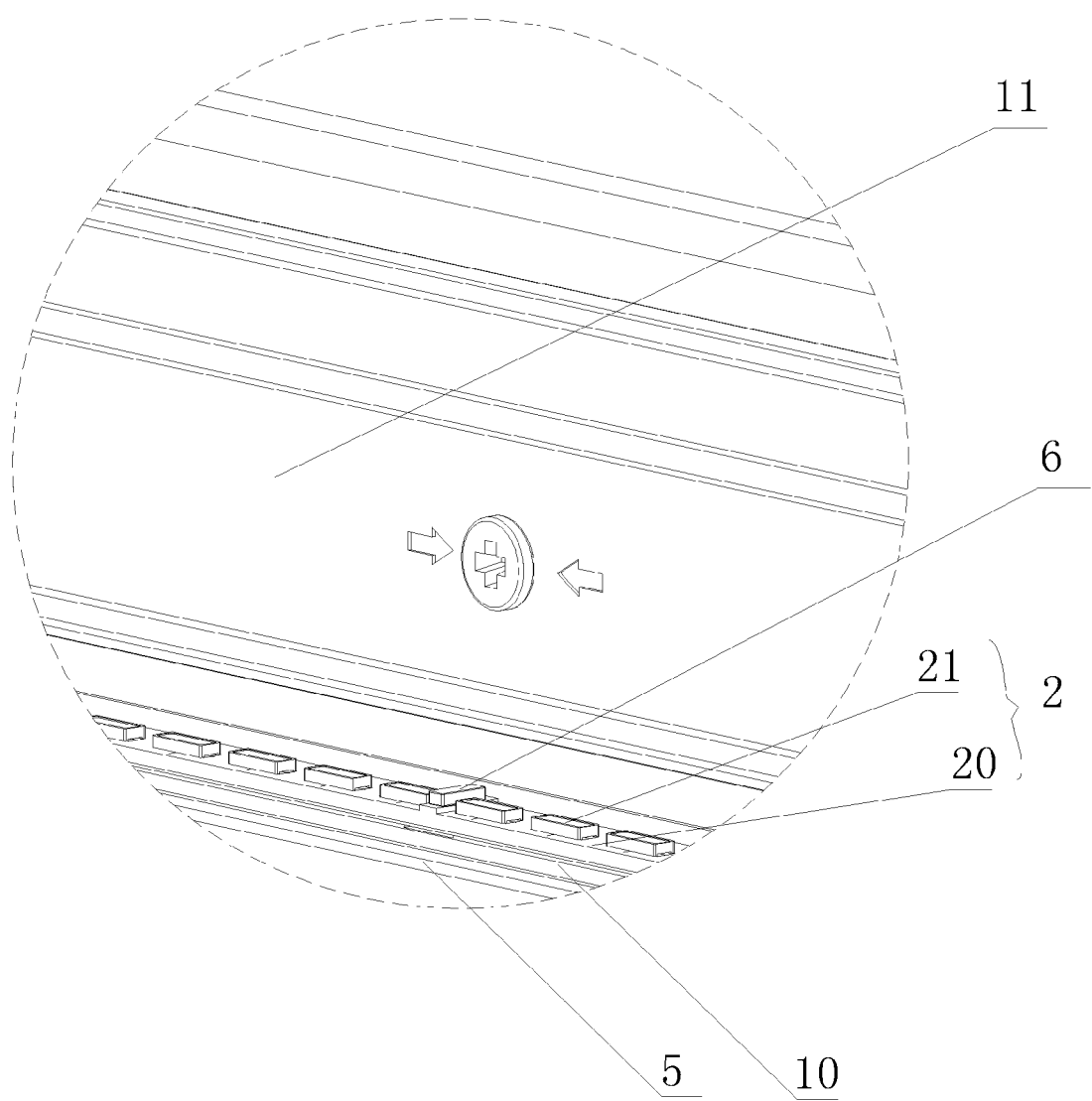
FIG. 2 is an enlarged view showing part A of FIG. 1.
Figure 3:
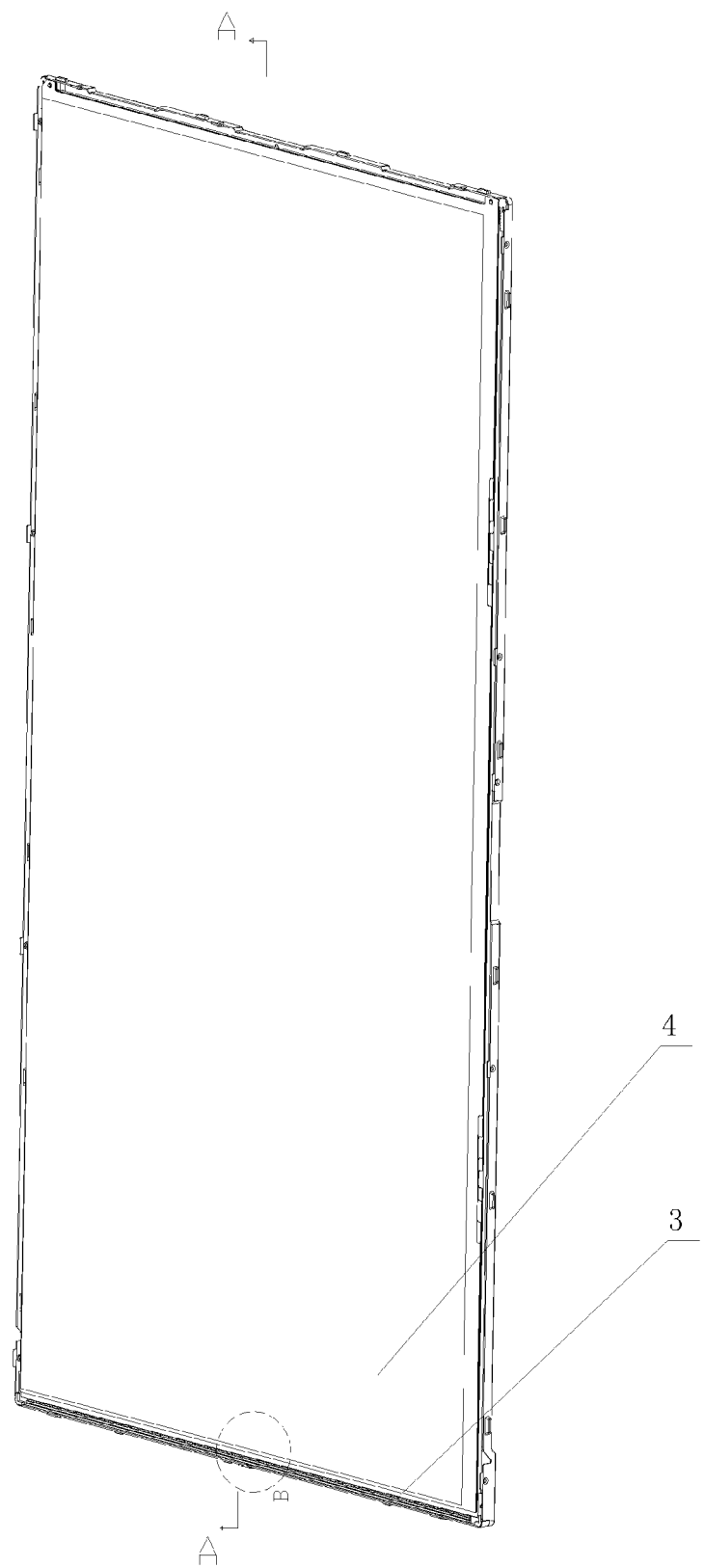
FIG. 3 is a schematic view showing the structure of a liquid crystal module with edge-lit backlight according to an embodiment of the present invention after installing the LGP.
Figure 4:
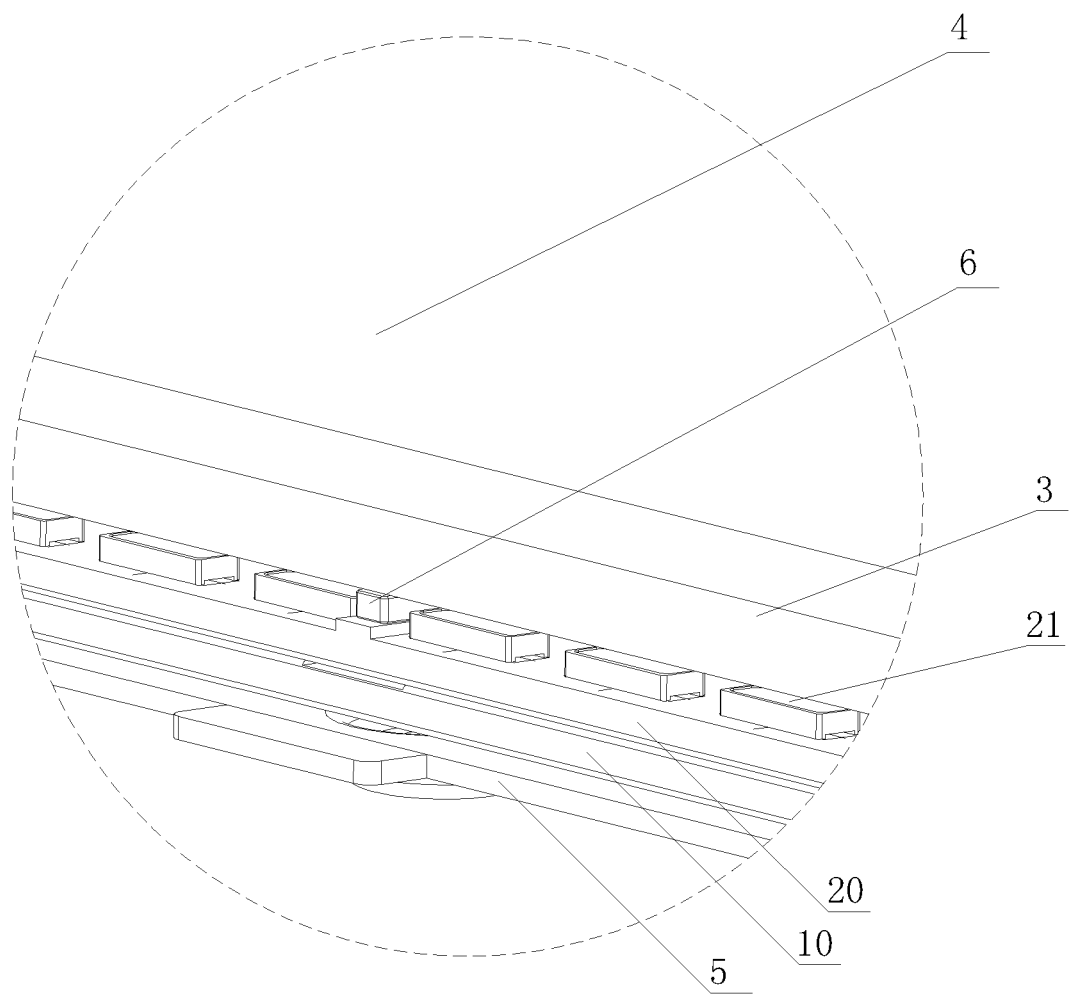
FIG. 4 is an enlarged view showing part B of FIG. 1.
Figure 5:
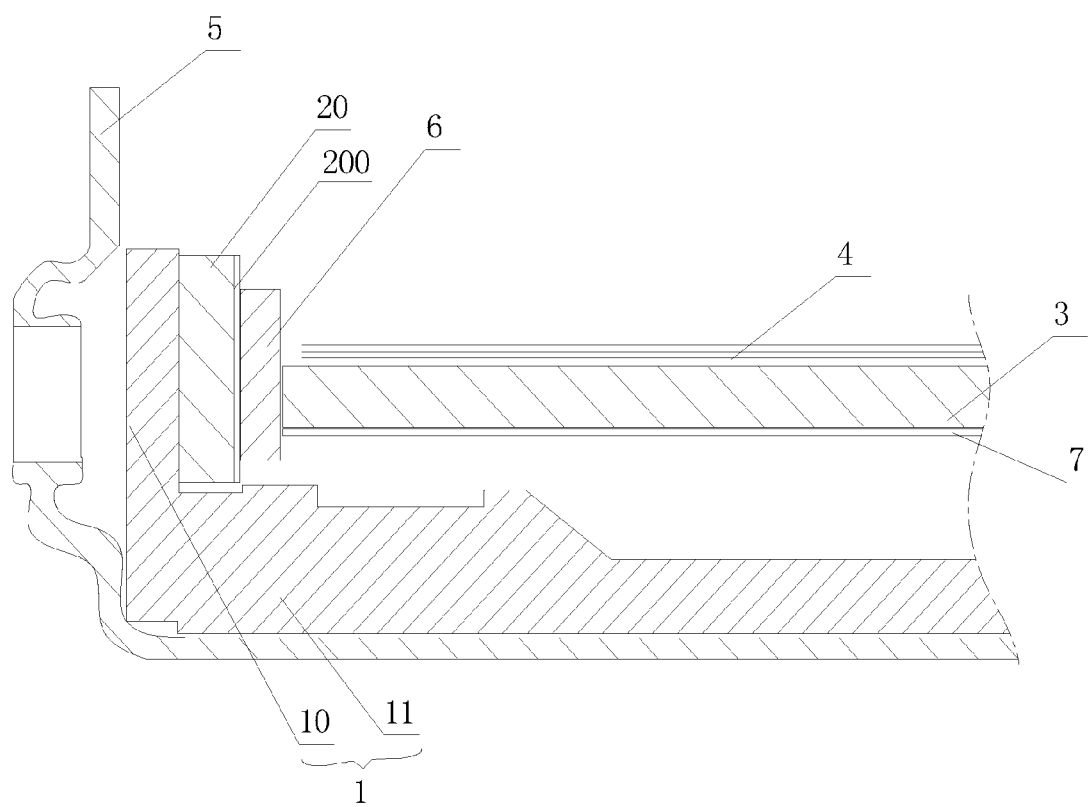
FIG. 5 is a cross-sectional view along A-A of FIG. 3.

The following refers to the drawings and the preferred embodiment to describe the present invention. FIGS. 1-5 show schematic views of the structure of the liquid crystal module with edge-lit backlight according to the present invention.

As shown in FIGS. 1-5, the liquid crystal module with edge-lit backlight at least comprises: an aluminum extrusion 1, the aluminum extrusion 1 further comprising: a aluminum extrusion bottom plate 11 and aluminum extrusion vertical plate 10 extended from and perpendicular to the aluminum extrusion bottom plate 11; an edge-lit backlight source 2, disposed on inner side wall of the aluminum extrusion vertical plate 10, the backlight source comprising 2: a backlight source substrate 20 and a plurality of LEDs 21 disposed on the backlight source substrate 20 with spacing; an LGP 3, disposed with an incident light surface and a light-emitting surface, the incident light surface facing the light-emitting surface of the LEDs of the edge-lit backlight source; an optical film set 4, located above the LGP 3, facing the light-emitting surface of the LGP 3, specifically, the optical film set 4 comprising, such as, diffuser, prism plate; a reflector 7, disposed below the LGP 3; a mold frame 5, located on outer side of the aluminum extrusion vertical plate 10; at least a magnetic device 6, disposed with at least an attaching surface, for attaching to the backlight source substrate 20, and an outer surface protruding beyond the light-emitting surface of LEDs 21; the outer surface of the magnetic device 6 facing the side of the LGP 3, specifically, close to or pressing against the LGP 3, and having a difference in height levels from the light-emitting surface of the LEDs. In the instant embodiment, the magnetic device 6 is an NdFeB magnet block of square shape. Because the NdFeB magnet block is a man-made magnet, the magnet is easy for manufacturing into various shapes and can withstand impact. It should be understood that the magnetic device of the present invention can be processed for various shapes. In addition, depending on the size of the liquid crystal module, the difference in height levels for the outer surface of the magnetic device 6 protruding beyond the light-emitting surface of the LEDs 21 is 0.3-1.5 mm.

In an embodiment, the backlight source substrate 20 is an aluminum plate. A plurality of LEDs 21 is disposed through pad on the backlight source substrate 20 with spacing. A nickel-plated layer 200 is disposed on the backlight source substrate 20 between at least two LEDs 21, and the attaching surface of the magnetic device 6 is attached to the nickel-plated layer 200.

In another embodiment, the backlight source substrate 20 is a glass fabric substrate. A plurality of LEDs 21 is disposed through pad on the backlight source substrate 20 with spacing. An iron layer 200 is wrapped in the backlight source substrate 20 between at least two LEDs 21 to replace the nickel-plated layer 200 in the previous embodiment, and the attaching surface of the magnetic device 6 is attached to the iron layer.

Correspondingly, the present invention further provides a liquid crystal display device, adopting the liquid crystal module disclosed in FIGS. 1-5.

According to the embodiments of the present invention, magnetic device (magnet block) is disposed between the adjacent LEDs on the LED light bar (backlight source substrate), and the magnetic device protrudes above the light-emitting surface of the LEDs for a certain distance so that when LGP contacts the magnetic device, the LGP will maintain a certain distance from the LEDs so as to ensure the coupling optical distance will not be too small. When the LGP is impacted by the external force or expands due to heat, the LGP will oppress the magnetic device and the magnetic device has sufficient strength to withstand the impact. As such, the LED will be free of impact or oppression to ensure the safety of the LEDs and extend the LED life span.

To improve the safety of LEDs, a plurality of magnetic devices can be disposed on the backlight source substrate with spacing.

In addition, the experiment shows that in the fixed magnetic field, the magnetic device imposes no effect on the refraction of the liquid crystal molecules in the liquid crystal display device, and thus no effect on the displaying.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A liquid crystal module with edge-lit backlight, which at least comprises:
    an aluminum extrusion with aluminum extrusion vertical plate;
    an edge-lit backlight source, disposed on inner side wall of the aluminum extrusion vertical plate, the backlight source comprising: a backlight source substrate and a plurality of LEDs disposed on the backlight source substrate with spacing;
    a light guiding plate (LGP), disposed with an incident light surface and a light-emitting surface, the incident light surface facing the light-emitting surface of the LEDs of the edge-lit backlight source;
    an optical film set, located above the LGP, facing the light-emitting surface of the LGP;
    a mold frame, located on outer side of the aluminum extrusion; and
    at least a magnetic device, disposed with at least an attaching surface, for attaching to a nickel-plated layer disposed on the backlight source substrate between at least two LEDs or an iron layer wrapped in the backlight source substrate between at least two LEDs, and an outer surface protruding beyond the light-emitting surface of LEDs; the outer surface of the magnetic device facing the side of the LGP and having a difference in height levels from the light-emitting surface of the LEDs.

2. The liquid crystal module with edge-lit backlight as claimed in claim 1, characterized in that the difference in height levels for the outer surface of the magnetic device protruding beyond the light-emitting surface of the LEDs is 0.3-1.5 mm.

3. The liquid crystal module with edge-lit backlight as claimed in claim 2, characterized in that the outer surface of the magnetic device is close to or presses against the LGP.

4. The liquid crystal module with edge-lit backlight as claimed in claim 3, characterized in that the aluminum extrusion comprises an aluminum extrusion bottom plate and an aluminum extrusion vertical plate extended from and perpendicular to the aluminum extrusion bottom plate.

5. The liquid crystal module with edge-lit backlight as claimed in claim 4, characterized in that the backlight source substrate is an aluminum plate or a glass fabric substrate.

6. A liquid crystal module with edge-lit backlight, which at least comprises:
    an aluminum extrusion with aluminum extrusion vertical plate;
    an edge-lit backlight source, disposed on inner side wall of the aluminum extrusion vertical plate, the backlight source comprising: a backlight source substrate and a plurality of LEDs disposed on the backlight source substrate with spacing;
    a light guiding plate (LGP), disposed with an incident light surface and a light-emitting surface, the incident light surface facing the light-emitting surface of the LEDs of the edge-lit backlight source;
    an optical film set, located above the LGP, facing the light-emitting surface of the LGP;
    a mold frame, located on outer side of the aluminum extrusion; and
    at least a magnetic device, disposed with at least an attaching surface, for attaching to the backlight source substrate, and an outer surface protruding beyond the light-emitting surface of LEDs; the outer surface of the magnetic device facing the side of the LGP and having a difference in height levels from the light-emitting surface of the LEDs.

7. The liquid crystal module with edge-lit backlight as claimed in claim 6, characterized in that the difference in height levels for the outer surface of the magnetic device protruding beyond the light-emitting surface of the LEDs is 0.3-1.5 mm.

8. The liquid crystal module with edge-lit backlight as claimed in claim 7, characterized in that the magnetic device is an NdFeB magnet block.

9. The liquid crystal module with edge-lit backlight as claimed in claim 8, characterized in that the aluminum extrusion comprises an aluminum extrusion bottom plate and an aluminum extrusion vertical plate extended from and perpendicular to the aluminum extrusion bottom plate.

10. The liquid crystal module with edge-lit backlight as claimed in claim 9, characterized in that the backlight source substrate is an aluminum plate or a glass fabric substrate.

11. The liquid crystal module with edge-lit backlight as claimed in claim 10, characterized in that a plurality of LEDs is disposed on the backlight source substrate with spacing, a nickel-plated layer is disposed on the backlight source substrate between at least two LEDs, and the attaching surface of the magnetic device is attached to the nickel-plated layer.

12. The liquid crystal module with edge-lit backlight as claimed in claim 10, characterized in that a plurality of LEDs is disposed on the backlight source substrate with spacing, an iron layer is wrapped inside the backlight source substrate between at least two LEDs, and the attaching surface of the magnetic device is attached to the iron layer.

13. A liquid crystal display device, which comprises a liquid crystal module with edge-lit backlight, the edge-lit backlight further comprising:
    an aluminum extrusion with aluminum extrusion vertical plate;
    an edge-lit backlight source, disposed on inner side wall of the aluminum extrusion vertical plate, the backlight source comprising: a backlight source substrate and a plurality of LEDs disposed on the backlight source substrate with spacing;

a light guiding plate (LGP), disposed with an incident light surface and a light-emitting surface, the incident light surface facing the light-emitting surface of the LEDs of the edge-lit backlight source;

an optical film set, located above the LGP, facing the light-emitting surface of the LGP;

a mold frame, located on outer side of the aluminum extrusion; and at least a magnetic device, disposed with at least an attaching surface, for attaching to a nickel-plated layer disposed on the backlight source substrate between at least two LEDs or an iron layer wrapped in the backlight source substrate between at least two LEDs, and an outer surface protruding beyond the light-emitting surface of LEDs; the outer surface of the magnetic device facing the side of the LGP and having a difference in height levels from the light-emitting surface of the LEDs.

14. The liquid crystal display device as claimed in claim 13, characterized in that the magnetic device is an NdFeB magnet block.

15. The liquid crystal display device as claimed in claim 14, characterized in that the difference in height levels for the outer surface of the magnetic device protruding beyond the light-emitting surface of the LEDs is 0.3-1.5 mm.

16. The liquid crystal display device as claimed in claim 15, characterized in that the outer surface of the magnetic device is close to or presses against the LGP.

17. The liquid crystal display device as claimed in claim 16, characterized in that the aluminum extrusion comprises an aluminum extrusion bottom plate and an aluminum extrusion vertical plate extended from and perpendicular to the aluminum extrusion bottom plate.

18. The liquid crystal display device as claimed in claim 17, characterized in that the backlight source substrate is an aluminum plate or a glass fabric substrate.

* * * * *